Figure 1:
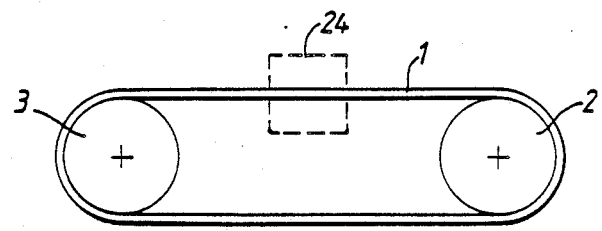

United States Patent [19]

Burdess et al.

[11] Patent Number: 4,928,538
[45] Date of Patent: May 29, 1990

[54] MONITORING TENSION IN AN ELONGATE FLEXIBLE MEMBER

[75] Inventors: James S. Burdess, 12 Earnshaw Way, Whitley Bay; John N. Fawcett, 5 Kingsland, Jesmond, Newcastle upon Tyne; James R. Hewit, Loughborough, all of United Kingdom

[73] Assignees: James Stonehouse Burdess, Whitley Bay; John Neville Fawcett, New Castle Upon Tyne, both of United Kingdom

[21] Appl. No.: 250,619

[22] PCT Filed: Mar. 12, 1987

[86] PCT No.: PCT/GB87/00171
§ 371 Date: Oct. 11, 1988
§ 102(e) Date: Oct. 11, 1988

[87] PCT Pub. No.: WO87/05699
PCT Pub. Date: Sep. 24, 1987

[30] Foreign Application Priority Data

Mar. 12, 1986 [GB] United Kingdom ................. 8606074

[51] Int. Cl.⁵ ............................ G01L 5/04; G01L 1/10
[52] U.S. Cl. ............................. 73/862.41; 73/DIG. 1
[58] Field of Search ........... 73/862.19, 862.07, 862.41, 73/862.59, 778, 517 AV, 702'704, DIG.1, 578, 579, 580, 581, 32 A

[56] References Cited

U.S. PATENT DOCUMENTS

| 3,470,734 | 10/1969 | Agdur et al. ........................ 73/32 A |
| 3,719,073 | 3/1973 | Mahon ............................. 73/861.22 |
| 3,850,031 | 11/1974 | Schwenzfeier et al. .......... 73/862.41 |
| 3,854,329 | 12/1974 | Jones ................................. 73/862.41 |
| 3,871,217 | 3/1975 | Miley ................................ 73/862.41 |
| 4,565,099 | 1/1986 | Arnold . |

FOREIGN PATENT DOCUMENTS

| 2907904A1 | 9/1979 | Fed. Rep. of Germany . |
| 2905861A1 | 8/1980 | Fed. Rep. of Germany . |
| 3333710 | 4/1985 | Fed. Rep. of Germany ... 73/862.41 |
| 2242674 | 3/1975 | France ................................. 73/704 |
| 0932315 | 6/1982 | U.S.S.R. .............................. 73/702 |
| 2109556A | 6/1983 | United Kingdom . |
| 2127544A | 4/1984 | United Kingdom . |

Primary Examiner—Charles A. Ruehl
Attorney, Agent, or Firm—Merchant, Gould, Smith, Edell, Welter & Schmidt

[57] ABSTRACT

A method of monitoring the tension in a flexible drive belt (1) which passes around a plurality of pulleys (2, 3) includes the steps of causing a portion of the belt (1) when installed around the pulleys to vibrate at a natural frequency and detecting that frequency. In one arrangement the belt (1) is set into a vibrating motion by an impulse and the frequency of the transient vibrations measured. In another arrangement the belt (1) vibrated by a drive mechanism which receives a drive signal derived from the belt movement. Specific methods and apparatus for monitoring the tension are also applied to measuring the tension in elongate flexible members other than drive belts.

15 Claims, 3 Drawing Sheets

MONITORING TENSION IN AN ELONGATE FLEXIBLE MEMBER

The present invention relates to monitoring tension in an elongate flexible member, in particular tension in a flexible drive belt which passes around a plurality of pulleys.

In many types of industrial machinery, flexible drive belts are used to transmit power and/or to provide timing synchronisation. These belts may have flat surfaces or may have surfaces which are grooved or ribbed to increase their ability to transmit power without slippage.

Whatever their construction such belts, for correct operation, must usually be set to within a special range of tensions. A belt which is too tight may be likely to suffer excessive wear and deterioration in operation, while a belt which is too loose may slip laterally off a guide pulley, or slip longitudinally, or jump teeth in the case of a ribbed belt. Thus an essential part of the initial setting up of the machine may be setting the belt tension to within an acceptable range of values. Particular difficulties arise in measuring the tension in a drive belt which has been installed around pulleys, one of which is the limited space that may be available for measuring the tension.

Currently available devices for measuring drive belt tension are purely mechanical. These devices clamp on to a short section of the belt and predict tension either by applying a known force and measuring belt deflection, or by applying a known deflection and measuring force. Through tests carried out in the laboratory using a tensile testing machine we have shown that these devices give both poor accuracy and poor repeatability of results. Measuring errors of up to 60% can occur in a random manner. One of the reasons why error occurs is that, if the belt slips by even a small amount where it is clamped, this will significantly alter the force/deflection characteristic.

Thus there is a real need for an improved drive belt tension monitoring device and method capable of achieving better levels of accuracy and repeatability in monitoring, and where appropriate measuring, the tension of a flexible drive belt. It is an object of the present invention to meet that need.

According to the invention there is provided a method of monitoring the tension in a flexible drive belt which passes around a plurality of pulleys, the method including the steps of causing a portion of the belt when installed around the pulleys to vibrate at a natural frequency and detecting the frequency of the resulting vibrations.

The term "natural frequency" as used herein refers to any frequency at which the belt will naturally vibrate. In the normal case this will be the fundamental frequency but it is possible to arrange for the belt to vibrate in harmonic modes at multiples of the fundamental frequency of vibration.

We have found that the natural frequency at which the belt vibrates provides an accurate and reliable indication of the tension of the belt. Although such drive belts are of significant thickness and do not therefore vibrate exactly in the manner of a simple string, we have found surprisingly that the technique of monitoring the natural frequency of vibration of the drive belt does provide a reliable indication of the tension in the belt.

The ends of the portion of the belt which is vibrated may be defined by points of engagement of the belt with the pulleys. In this case there is no need to provide any additional clamping arrangement for fixing ends of the vibrating portion of the belt.

The belt may be vibrated by the application of an initial impulse thereto and thereafter be left to vibrate freely, substantially without the influence of external forces. In this case the belt automatically vibrates at a natural frequency.

Alternatively the portion of the belt caused to vibrate may be vibrated by a drive mechanism at a natural frequency and at a substantially steady amplitude while the natural frequency of the vibrations is detected. This method has the advantage that there is a steady vibration of the belt which facilitates measurement of the frequency of that vibration.

The drive mechanism may be driven by a signal derived from sensing means for monitoring movement of the belt, the sensing means having an output dependent on the direction of the velocity of the vibrating portion of the belt.

In the case where the belt is caused to vibrate by a single impulse this may be provided by striking it with the hand or with a hend-held striker, but it is preferred that a mechanical means be included for that purpose. For example, the mechanical means may comprise a solenoid-operated plunger which may be sprung-biased away from the belt and caused to strike the belt when the solenoid receives an electrical impulse.

According to another aspect of the invention there is provided an apparatus for monitoring the tension in a flexible drive belt which passes around a plurality of pulleys, the apparatus including a transducer for sensing vibrations of a portion of the belt when the belt is installed around the pulleys and means for detecting the frequency of vibrations received by the transducer.

The apparatus may include a drive mechanism for vibrating the portion of the belt. The drive mechanism may be arranged to initiate vibration of the portion of the belt but thereafter to remain inactive allowing the portion of the belt to vibrate freely at a natural frequency, or alternatively it may be arranged to vibrate the portion of the belt at a natural frequency and at a substantially steady amplitude. In the latter case the drive mechanism may be connected to receive via an amplifier a signal derived from the transducer, or may be connected via an amplifer to an output of a control unit which receives a signal derived from the transducer.

The transducer may take the form of a single simple microphone mounted close to the belt in the region of the portion to be vibrated. The transducer is preferably located at a distance from the ends of the vibrating portion, most preferably in the region of the middle of its length. In a highly advantageous and preferred form of the invention, a pair of transducers arranged on opposite sides of the belt are provided and are arranged such that their output signals can be combined to provide an enhanced belt vibration signal. If the transducers are microphones they may be located, one on each side of the belt facing the opposite surfaces of the belt with their axes generally parallel to the direction of the vibrations. Using two microphones in this way, the belt vibrations detected by the different microphones are 180° out of phase with each other, while distant noise arrives at the two microphones substantially in phase. Thus, if the signals from the two microphones are subtracted one from the other, the belt vibration signal is effectively doubled while the noise signal is substantially reduced or eliminated.

The transducer may be an ultrasonic receiver and may have associated with it a device for transmitting an ultrasonic signal towards the belt. The modulation of the transmitted signal brought about by the vibrating belt is characteristic of the frequency of vibration of the belt and the frequency of vibration can therefore be determined.

The present invention also provides a drive belt assembly including a plurality of pulleys and a flexible drive belt which passes around the pulleys, and an apparatus for monitoring the tension in the drive belt, the apparatus being as defined above and being mounted such that it can be brought into operative cooperation with the drive belt.

The signal generated by the transducer is monitored to establish the belt vibration frequency which in turn is a measure of the tension of the belt. By prior calibration of the equipment, the need to determine the specific value of the tension, or indeed of the frequency, may in appropriate circumstances be avoided. Thus in a repetitive quality-control operation, for example where a large number of identical products are to be checked as on an assembly line or where the tension of a given belt is to be monitored at intervals during the operation of a machine, the frequency of the received signal may simply be compared with a standard value or range of values. Such comparison may be made automatically by means of a data processor or the received signal may be compared electronically with a signal of standard frequency. In either case, it may then only be necessary to indicate the nature of the result of the comparison, for example by means of one or more indicator lights. Thus such lights may indicate whether the tension of the belt does or does not match a desired standard value or range of values, or more specifically, to enable corrective adjustment of the tension, the lights may indicate whether the belt tension value is too high or too low.

Where it is necessary or desired to determine the actual value of the belt tension, constants characteristic of the belt itself and of its location during the measurement must be determined by experiment. The relationship between observed frequency and tension in a belt may be expressed reasonably accurately by the formula:

$$T = A + B f^2 l^2 m$$

where,
T is tension,
f is the frequency of the first (fundamental) mode of transverse vibration of the belt,
l is the belt span length,
m is the mass per unit length of the belt, and,
A and B are constants for a belt of given cross-section and of given composition.

When the vibration frequency has been measured, the tension of the belt may be calculated by hand but it is much preferred to provide a data processor, to enable quick determination of the desired information and to more readily carry out frequent and/or repetitive determinations.

When it is desired to measure the specific value of the belt tension, the calculated answer may be displayed in digital form on an L E D (light emitting diode) or L C D (liquid crystal) display. Alternatively or additionally, the value may be presented in hard copy form, thus providing records for guarantee or quality control purposes.

While the specific method and apparatus for monitoring the tension has been defined above with regard to monitoring tension in a flexible drive belt, and this is the application for which the apparatus and method have specifically been designed, it would be possible to use the method and apparatus for monitoring the tension in a variety of elongate flexible members. Accordingly the present invention also provides a method of monitoring the tension in an elongate flexible member, the method including the steps of causing at least a portion of the flexible member to vibrate at a natural frequency and detecting the frequency of the resulting vibrations with a pair of transducers arranged on opposite sides of the flexible member and combining the output signals of the transducers; and also provides a method of monitoring the tension in an elongate flexible member, the method including the steps of vibrating at least a portion of the flexible member at a natural frequency by a drive mechanism which is driven by a signal derived from sensing means for monitoring movement of the flexible member, and detecting the frequency of the vibrations. Furthermore the present invention provides an apparatus for monitoring the tension in an elongate flexible member, the apparatus including a drive mechanism for vibrating at least a portion of the elongate flexible member, a pair of transducers arranged to be positioned on opposite sides of the vibrating member for sensing vibrations of the member and arranged such that their output signals are combined to provide an enhanced belt vibration signal, and means for detecting the frequency of vibrations received by the transducers; and an apparatus for monitoring the tension in an elongate flexible member, the apparatus including a drive mechanism for vibrating at least a portion of the elongate flexible member at a natural frequency, a transducer for sensing vibrations of the member having an output which is used to control a drive signal for the drive mechanism and means for detecting the frequency of vibration of the belt.

Figure 3:
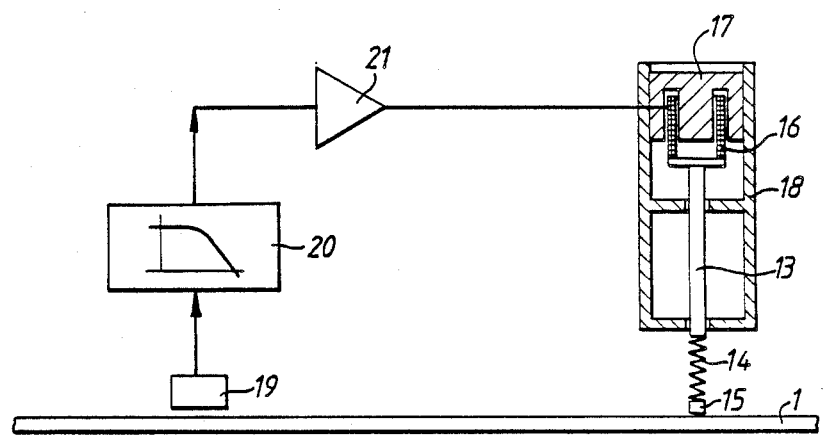
Figure 5:
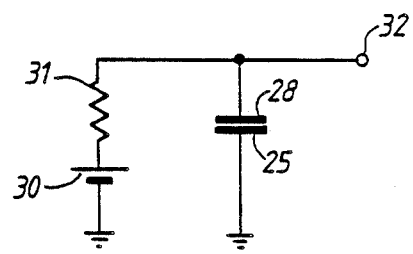
Figure 2:
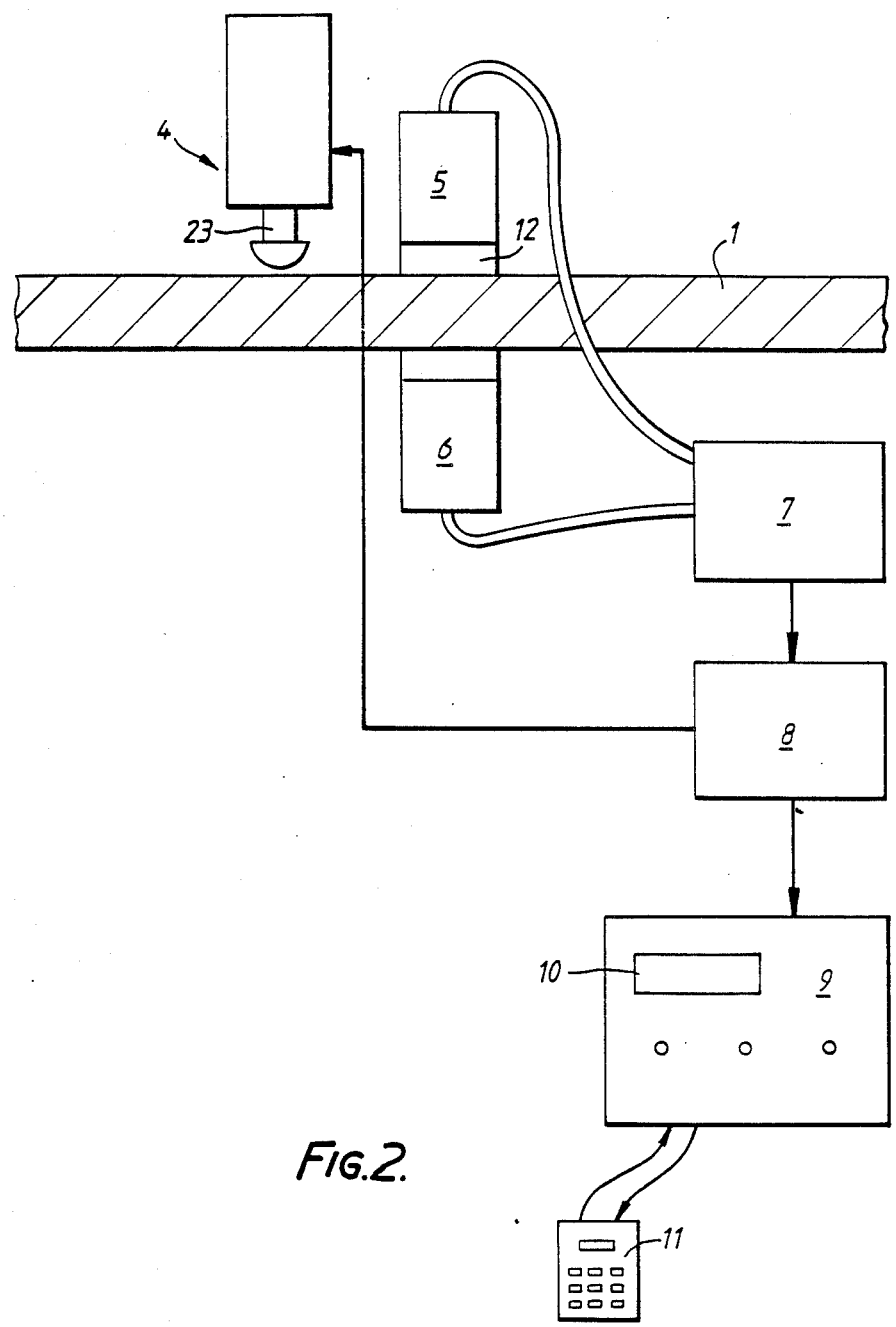
Figure 4:
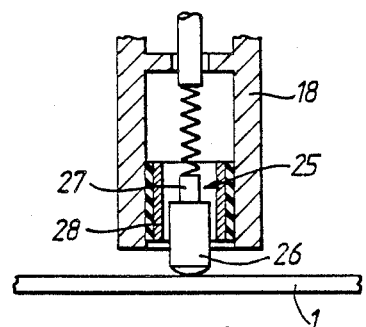
Figure 6:
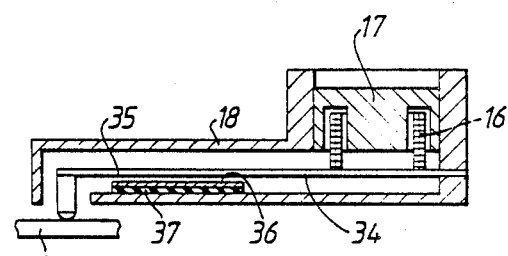
Figure 7:
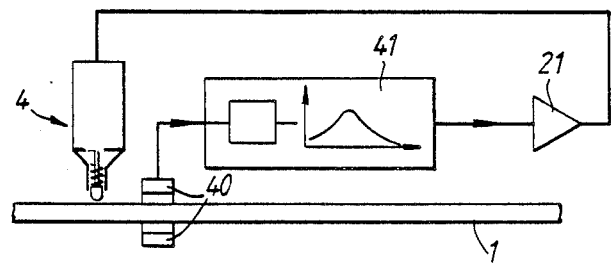

The invention will now be further described with reference to the accompanying drawings, which illustrate schematically and by way of example, certain embodiments of the present invention and in which:

FIG. 1 is a diagram of a flexible drive belt assembly whose tension is being monitored by a device embodying the invention, FIG. 2 shows the general arrangement of one form of monitoring device together with a control and display system, FIG. 3 shows the general arrangement of another form of monitoring device, FIG. 4 shows the general arrangement of another form of monitoring device being a modification of the arrangement shown in FIG. 3, FIG. 5 shows an electric circuit which may be employed with the monitoring device of FIG. 4, FIG. 6 shows the general arrangement of another form of monitoring device, being a modification of the arrangement shown in FIG. 4, and FIG. 7 shows the general arrangement of another form of monitoring device, being another modification of the arrangement shown in FIG. 3.

Referring first to FIG. 1, there is shown a flexible drive belt 1 passing a round a pair of pulleys 2, 3 and a device 24 for monitoring the tension in the drive belt. While only two pulleys are shown in FIG. 1 it will be appreciated that in certain applications the drive belt may pass around more than two pulleys.

Referring now to FIG. 2, there is shown a first example of a tension monitoring device generally comprising a drive mechanism 4 for vibrating the upper span of the belt 1 extending between the pulleys 2, 3 at its fundamental frequency, transducer means 5, 6 for sensing the resulting vibrations, and a control and display system comprising a signal conditioning unit 7, a computer 8, an operator interface and display unit 9 having a display 10, and a keyboard 11.

The drive mechanism 4 is mounted above belt 1 and has a plunger 23 generally perpendicular to a flat face of the belt and spaced, when the plunger is withdrawn, just a few millimeters from the belt. The plunger 23 is spring-biassed away from the belt but, when a solenoid surrounding the plunger receives an electrical impulse, the plunger is extended to strike the belt 1 a sharp blow. The blow causes the belt to vibrate freely at its fundamental frequency as determined by its mass per unit length, the length of the unsupported span between the pulleys and the tension of the belt.

The transducer means comprises two microphones 5, 6 set in a common sensing head 12 and disposed facing the belt 1 on opposite sides of the belt. The microphones receive acoustic signals which are directly out of phase but are both at a frequency corresponding to the fundamental frequency of vibration of the belt. The signals are fed to the signal conditioning unit 7 wherein they are combined by subtraction and the resulting signal is filtered to further reduce noise effects, amplified and finally converted to square-wave form.

The square-wave signal, which is still at the frequency of vibration of the belt 1, is fed to a computer 8, which processes the data arising from operation of the device and also controls the operation. In the computer 8, the time of a fixed number of cycles of the signal is measured and the belt tension is calculated, the constants and belt characteristics required for the calculation having previously been determined by experiment or measured as appropriate.

Operation of the device overall is via the operator interface and display unit 9, upon the display 10 of which the calculated value of the belt tension is shown, and the keyboard 11. If desired, a printer may be linked to the unit 9 to provide hard copy record of the measured frequencies. When the tension has been displayed and recorded, the control computer 8, upon receiving a command entered through the keyboard 11, sends a fresh impulse to the solenoid of the striker device 1 and the next measurement cycle is begun.

Instead of displaying the tension, the display 10 may simple indicate some number indicative of a value of tension or range of values. As an alternative or in addition, the display 10 may have one or more indicator lights. For example there may be a green light in the event that the tension is found to lie within an acceptable range of values and a red light in the event that it is not. An audible signal may also be given.

The tension monitoring device may be incorporated into a production line for drive belt assemblies. In such a case the device may be mounted on a jig movable into and out of engagement with a drive belt assembly as it passes down the production line.

While in FIG. 2 microphones are shown as transducers, it should be understood that other forms of transducer means such as the ultrasonic arrangement referred to above or one of the capacitative arrangements described below could be employed.

FIG. 3 shows a second example of a tension monitoring device in which the belt is vibrated at a steady amplitude at its fundamental frequency, while the frequency of the vibrations is measured. In this case the drive mechanism comprises a plunger 13, a bias spring 14 extending from one end of the plunger 13 and having a free end 15 engaging the belt 1, and a coil assembly 16 carried on the other end of the plunger 13 and cooperating with a magnet 17. The plunger 13, carrying the coil assembly 16 and the spring 14 is slidably mounted in a casing 18 in which the magnet 17 is fixed. The construction of the magnet 17 and moving coil assembly 16 is similar to that used in many commercial loudspeaker units. An electric current passing through the coil assembly 16 produces a force on the assembly acting along the centre line of the plunger 13, the force being proportional to the current passing through the coil. This force is transmitted to the belt 1 via the spring 14. Although the end of the spring 14 remains in contact with the belt 1 the drive mechanism has little effect on the frequency of fundamental vibration of the belt because of its light weight and the fact that the only connection between the belt and the drive mechanism is a resilient one (the spring 14).

A condenser microphone 19 is provided in close proximity to the belt 1 for sensing vibrations of the belt. While in FIG. 3 this is shown as a single microphone it should be understood that two microphones may be used as shown in FIG. 2. The microphone 19 is connected to a signal conditioning unit 20 which may be similar to the unit 7 of FIG. 2. That unit may be connected to a computer, an operator interface and display unit and a keyboard as already described in respect of FIG. 2; these parts are omitted in FIG. 3. The output of the signal conditioning unit 20 is also connected via a power amplifier 21 to the moving coil assembly 16.

When the belt 1 moves, the microphone 19 generates a signal whose amplitude is proportional to the velocity of the belt at that point. It will now be seen that when the arrangement is switched on any movement of the belt will result in a signal to the coil assembly 16 and it is a simple matter to arrange for the force applied to the plunger 13 by the moving coil assembly 16 to be in the same direction as the velocity of the belt sensed by the microphone 19 and substantially in phase therewith regardless of the frequency of vibration, since there need be no significant time delay in a signal being transmitted from the microphone 19 to the coil assembly 16. As a result, the system will automatically adjust itself to a state in which the belt is vibrating at its fundamental frequency. If the output of the microphone 19 contains signal components which are not at the fundamental frequency of the belt but are due for example to noise, these components will not sustain a steady amplitude of vibration and will die away. The vibration measured by the microphone is thus of steady amplitude and periodic. Its frequency can be found, as in FIG. 2, by timing a fixed number of cycles but because the amplitude of the vibration is steady the timing can be begun at the convenience of the operator and can be over an increased number of cycles which may increase the accuracy of the tension measurement. The system may be arranged to be unstable so that as soon as power is supplied, the belt begins to vibrate, or it may be arranged with less feedback so that the belt does not begin to vibrate until an initial impulse is applied to it.

In the arrangement of FIG. 3, the transducer (microphone) and drive mechanism are preferably in close proximity to one another and also in the centre region of the belt. It is however possible to combine the functions of these two parts into a single assembly. FIG. 4 shows one possible arrangement. In this case the moving coil assembly and magnet are provided in the casing 18 as in FIG. 3 but a metallic contact 25 in the form of a stepped rod is fixed to the belt engaging end of the bias spring 14. The contact 25 is stepped having an outer portion 26 of relatively large diameter circular cross-section and an inner portion 27 of relatively small diameter circular cross-section. A cylindrical electrode 28 is fixed to the casing 18 and closely surrounds the outer portion 26 of the contact 25, at least in the region of its junction with the portion 27. The electrode 28 is separated from the casing 18 by a layer of electrical insulation. The gap between the electrode 28 and the outer portion 26 of the contact 25 is exaggerated in FIG. 4 and is in practice very small. The contact 25 is mounted for sliding movement along the common axes of the contact and the electrode 28 and this mounting is conveniently achieved by a thin insulating layer applied to the inner surface of the electrode 28 or the outer portion 26 of the contact 25 to form a sliding bearing between these two parts. Because the gap between the electrode 28 and the outer portion 26 of the contact 25 is small, these parts define a capacitor and, since the gap between the electrode 28 and the inner portion 27 is much bigger, the capacitance of the capacitor varies as the contact 25 slides relative to the electrode 28.

The electrode 28 and contact 25 are connected into an electric circuit shown in its simplest form in FIG. 5. The variable capacitance provided by the electrode 28 and contact 25 are connected in parallel with a direct current power supply 30 and a resistance 31. As the contact 25 is pushed into the casing 18 by the belt, the capacitance will increase and vice versa. Thus the output voltage at the output 32 of the circuit is proportional to the velocity of the belt vibration at the contact point. As will now be understood this output voltage corresponds to the output voltage of the microphone 19 of FIG. 3 and can be passed to the signal conditioning unit 20 of FIG. 3. The other parts of the arrangement that are not shown in FIG. 4 may therefore be as described above with reference to FIG. 3.

FIG. 6 shows another possible arrangement in which the functions of the microphone and drive mechanism are combined. The arrangement is generally similar to FIG. 4 and corresponding parts are referenced by the same reference numerals. In the arrangement of FIG. 6 the bias spring 34 is in the form of a light cantilever spring fixed directly to the moving coil assembly 16. The cantilever spring has a distal end which has an electrically conducting portion 35 spaced slightly from an electrode strip 36 fixed to the casing 18 and insulated therefrom by insulation 37. As the belt moves the distal end of the bias spring is moved changing the separation of the portion 35 of the spring and the electrode strip 36 and thus altering the capacitance therebetween. As in the arrangement of FIG. 4 the output voltage across this capacitance when connected in the circuit of FIG. 5 is proportional to the velocity of the belt.

FIG. 7 shows another arrangement of microphone and control which is similar to that shown in FIG. 3 and which may be used with the drive mechanism of FIG. 3. In this case the output of a pair of microphones 40, arranged relative to the belt as described in respect of FIG. 2, is passed directly to a computer 41 to which an operator interface and display unit (not shown) and a keyboard (not shown) may be connected as described in respect of FIG. 2. In the arrangement of FIG. 7 one of the tasks of the computer 41 is to calculate the R.M.S. level of the microphone signal and the computer is programmed to change the frequency of the output signal it supplies via the power amplifier 21 to the moving coil assembly 16 so as to maximise this R.M.S. level of the microphone signal. That effect may be achieved by the computer using what is known as a "hill climbing" algorithm: such algorithms are well known. Once the R.M.S. level of the microphone signal is at a maximum, it is known that the belt is vibrating at its fundamental frequency which can then be determined.

While various specific embodiments of the invention have been described with reference to the accompanying drawings, it will be appreciated that many modifications can be made to them. For example, features described specifically in respect of one embodiment may, where appropriate, be incorporated in other embodiments.

We claim:

1. A method of monitoring the tension in an elongate flexible member, the method including the steps of causing at least a portion of the flexible member to vibrate at a natural frequency and detecting the frequency of the resulting vibrations with a pair of transducers arranged on opposite sides of the flexible member and subtracting one transducer output signal from the other transducer output signal to provide an enhanced flexible member vibration signal and to reduce extraneous noise signals.

2. A method according to claim 1 in which the elongate, flexible member is a drive belt and the ends of the portion of the belt which is vibrated are defined by points of engagement of the belt with pulleys about which the belt passes.

3. A method according to claim 1 in which the portion of the member caused to vibrate is thereafter left to vibrate freely substantially without the influence of external forces.

4. A method according to claim 1 in which the portion of the member caused to vibrate is vibrated by a drive mechanism at a natural frequency and at a substantially steady amplitude while the natural frequency of the vibrations is detected.

5. A method according to claim 4 in which the drive mechanism is driven by a signal derived from sensing means for monitoring movement of the member, the sensing means having an output dependent on the direction of the velocity of the vibrating portion of the member.

6. An apparatus for monitoring the tension in a flexible drive belt which passes around a plurality of pulleys, the apparatus including a pair of transducers for arrangement on opposite sides of the belt for sensing vibrations of a portion of the belt when the belt is installed around the pulleys, the transducers being arranged such that their output signals can be combined to provide an enhanced belt vibration signal, means for detecting the frequency of vibrations received by the transducers, and means for combining the transducer output signals to produce an enhanced belt vibration signal.

7. An apparatus according to claim 6 including a drive mechanism for vibrating the portion of the belt.

8. An apparatus according to claim 7 in which the drive mechanism is arranged to initiate vibration of the portion of the belt but thereafter to remain inactive allowing the portion of the belt to vibrate freely.

9. An apparatus according to claim 7 in which the drive mechanism is arranged to vibrate the portion of the belt at the natural frequency and at a substantially steady amplitude.

10. An apparatus according to claim 9 in which the drive mechanism is connected to receive via an amplifier a signal derived from the transducers.

11. An apparatus according to claim 9 in which the drive mechanism is connected via an amplifier to an output of a control unit which receives a signal derived from the transducers.

12. An apparatus according to claim 6 in which the transducers are microphones.

13. An apparatus according to claim 6 in which the transducers are ultrasonic receivers and have associated with them devices for transmitting an ultrasonic signal towards the belt.

14. A drive belt assembly including a plurality of pulleys and a flexible drive belt which passes around the pulleys, and an apparatus for monitoring the tension in the drive belt, the apparatus being as claimed in claim 6 and being mounted such that it can be brought into operative cooperation with the drive belt.

15. An apparatus according to claim 6, wherein one said transducer is positioned directly across said belt from said other transducer.

* * * * *